(12) United States Patent  (10) Patent No.: US 8,929,030 B2
Hou et al.  (45) Date of Patent: *Jan. 6, 2015

(54) MAGNETIC WRITER FOR FIELD ASSISTED MAGNETIC RECORDING

(75) Inventors: Chunhong Hou, Savage, MN (US); Shaoping Li, Naperville, IL (US); John M. Wolf, Maple Grove, MN (US); Sining Mao, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 1759 days.

This patent is subject to a terminal disclaimer.

(21) Appl. No.: 11/724,536

(22) Filed: Mar. 15, 2007

(65) Prior Publication Data

US 2008/0225435 A1 Sep. 18, 2008

(51) Int. Cl.
*G11B 5/127* (2006.01)
*G11B 5/02* (2006.01)
*G11B 5/31* (2006.01)
*G11B 5/00* (2006.01)

(52) U.S. Cl.
CPC ........ *G11B 5/314* (2013.01); *G11B 2005/0005* (2013.01); *G11B 5/02* (2013.01); *G11B 5/1278* (2013.01)
USPC ..................................... 360/125.3

(58) Field of Classification Search
USPC ............................. 360/125.06–125.11, 125.3
See application file for complete search history.

(56) References Cited

U.S. PATENT DOCUMENTS

| | | | |
|---|---|---|---|
| 4,423,450 A * | 12/1983 | Hamilton | 360/111 |
| 5,978,186 A * | 11/1999 | Murata et al. | 360/123.39 |
| 6,665,136 B2 | 12/2003 | Clinton et al. | |
| 6,785,092 B2 | 8/2004 | Covington et al. | |
| 6,917,493 B2 | 7/2005 | Clinton et al. | |
| 2004/0169950 A1 | 9/2004 | Clinton et al. | |
| 2005/0068659 A1* | 3/2005 | Gillis et al. | 360/75 |
| 2005/0259354 A1 | 11/2005 | Piramanayagam et al. | |
| 2006/0114606 A1 | 6/2006 | Ide | |
| 2006/0198047 A1* | 9/2006 | Xue et al. | 360/126 |
| 2008/0316631 A1* | 12/2008 | Gao et al. | 360/55 |

* cited by examiner

*Primary Examiner* — Joseph Feild
*Assistant Examiner* — Gustavo Polo
(74) *Attorney, Agent, or Firm* — Mueting, Raasch & Gebhardt, P.A.

(57) ABSTRACT

A writer includes a write element having a tip portion to generate a write field during a write operation and a conductive assembly that delivers a write assist current through the tip portion in a cross-track direction to generate a write assist field during the write operation that extends beyond a medium confronting surface located at the tip portion to lower a coercivity of a magnetic medium proximate to the write element.

18 Claims, 4 Drawing Sheets

MAGNETIC WRITER FOR FIELD ASSISTED MAGNETIC RECORDING

BACKGROUND OF THE INVENTION

The present invention relates to magnetic devices. More particularly, the present invention relates to a recording system including a writer that employs a current through the write element to reduce the coercivity in a portion of a magnetic medium.

Recording heads for use with magnetic storage media typically include a writer and a reader that respectively record and detect magnetic domains in a medium below the head. The writer can include a coil of one or more turns wrapped around a soft ferromagnetic yoke. Writers operate by passing an electric current through the coil, which produces a magnetic field that aligns the yoke magnetization along the field direction. For a longitudinal writer, a magnetic field extends mainly between the pole tips but also partly into the media. For a perpendicular writer, a soft underlayer can be employed in the storage media such that the write field extends between the pole tip and soft underlayer. When the write field exceeds the coercivity and demagnetization field of the media, a domain forms with its magnetization aligned along the write field direction. These domains form the bits of digital data that are detected with the read head.

There are significant physical challenges in trying to achieve an areal density of 1 Tbit/in$^2$ with magnetic recording. The write process is among these challenges, in which magnetic domains, or bits, are created in the media. At these densities, the two primary obstacles facing the write process are the use of materials with large magnetic anisotropy in the media and the lack of soft ferromagnetic materials having $B_s > 2.4$ T. The first obstacle is necessary to ensure thermal stability of the media. The average volume of the grains will have to decrease in order to maintain the same media signal-to-noise ratio, which is roughly set by the number of grains in a bit cell. However, in order to avoid superparamagnetism, the magnetic anisotropy has to increase commensurately so that the grains are ferromagnetic and stable over a time scale of years. The net result is that very large magnetic fields will be needed in order to orient the grains and record bits in the media. Since the write field is intimately related to the saturation moment of the pole tip material in the recording head, very high moment materials will be needed to switch the orientation of the media magnetization. Researchers are already using materials with $B_s$ of about 2.0-2.4 T for 100 Gbit/in$^2$ recording, and the saturation moment requirement for conventional recording at 1 Tbit/in$^2$ is likely to be beyond any known material.

These challenges are well known in the data storage industry and alternative approaches to magnetic recording, such as thermally assisted writing, have already been proposed. However, the best writer technology for 1 Tbit/in$^2$ is still undetermined. For instance, researchers are also investigating ways to switch the magnetization of thin film media that do not rely on thermally assisted processes. These approaches are different in that the alignment of the magnetic field with respect to the media magnetization is significantly different than 0° or 180°. The ultimate goal is to switch the media magnetization using fields that are less than the anisotropy field, $H_k$.

BRIEF SUMMARY OF THE INVENTION

The present invention relates to a writer including a write element having a tip portion for generating a write field and a conductive assembly that delivers a write assist current through the tip portion to generate a write assist field.

DETAILED DESCRIPTION

Figure 1:
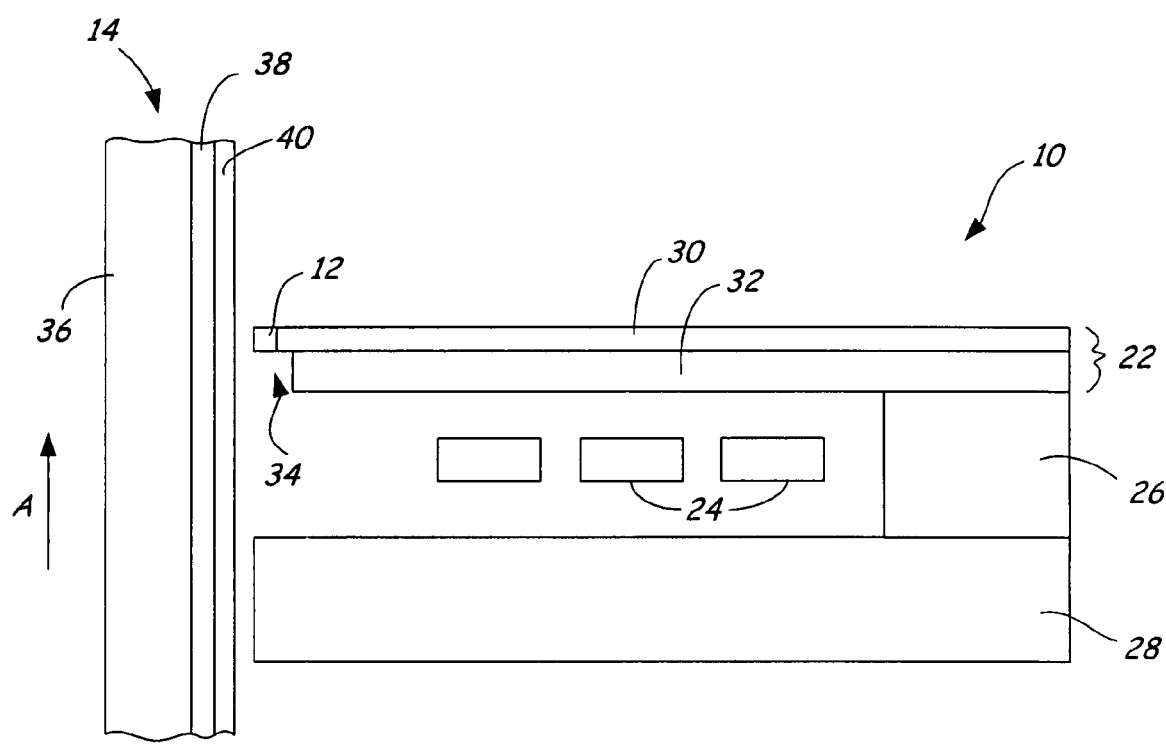
FIG. 1 is a side view of a magnetic writer including a conductive element for carrying a write assist current through the write pole tip.

FIG. 1 is a side view of magnetic writer 10 and conductive element 12 for carrying a write assist current disposed proximate to magnetic medium 14. Magnetic writer 10 includes write pole 22, conductive coils 24, back via 26, and return pole 28. Write pole 22, which includes main portion 30 and yoke portion 32, is connected to return pole 28 by back via 26 distal from the surface of magnetic writer 10 that confronts magnetic medium 14. Conductive coils 24 surround back via 26 such that turns of conductive coils 24 are disposed in the gap between write pole 22 and return pole 28.

Magnetic writer 10 is carried over the surface of magnetic medium 14, which is moved relative to magnetic writer 10 as indicated by arrow A such that write pole 22 is the trailing pole and is used to physically write data to magnetic medium 14. Conductive coils 24 surround back via 26 such that, when a write current is caused to flow through conductive coils 24, the magnetomotive force in the coils magnetizes write pole 22 and return pole 28. This causes a write field to be generated at pole tip 34 of main portion 30, which is used to write data to magnetic medium 14. The direction of the write field at pole tip 34, which is related to the state of the data written to magnetic medium 14, is controllable based on the direction that the write current that flows through conductive coils 24.

Magnetic writer 10 is shown merely for purposes of illustrating a construction that may be used in conjunction with write assist element 12, and variations on this design may be made. For example, while write pole 22 includes main portion 30 and yoke portion 32, write pole 22 can also be comprised of a single layer of magnetic material, return pole 28 may be removed from the structure to provide a single pole writer configuration, or an additional return pole may be magnetically coupled to write pole 22 on a side opposite return pole 28. In the latter case, a shield may additionally be formed to extend from the trailing return pole toward write pole 22 proximate the medium confronting surface in a "trailing shield" magnetic writer design. In addition, magnetic writer 10 is configured for writing data perpendicularly to magnetic medium 14, but magnetic writer 10 and magnetic medium 14 may also be configured to write data longitudinally. Furthermore, a magnetic reader may be provided adjacent to and carried over magnetic medium 14 on the same device as magnetic writer 10.

Magnetic medium 14 includes substrate 36, soft underlayer (SUL) 38, and medium layer 40. SUL 38 is disposed between substrate 36 and medium layer 40. Magnetic medium 14 is positioned proximate to magnetic writer 10 such that the surface of medium layer 40 opposite SUL 38 faces write pole 22. In some embodiments, substrate 36 is comprised of a non-magnetic material, such as aluminum and aluminum based alloys, SUL 38 is comprised of a magnetically soft (i.e., high permeability) material, and medium layer 40 is comprised of a granular material having a high perpendicular anisotropy and high coercivity.

SUL 38 is located below medium layer 40 of magnetic medium 14 and enhances the amplitude of the write field produced by the write pole 22. The image of the write field is produced in SUL 38 to enhance the field strength produced in magnetic medium 14. As the write field from write pole 22 (and in particular, pole tip 34) passes through medium layer 40, medium layer 40 is magnetized perpendicular to the medium plane to store data based on the write field direction. The flux density that diverges from pole tip 34 into SUL 38 returns through return pole 28. Return pole 28 is located a sufficient distance from write pole 22 such that the material of return pole 28 does not affect the magnetic flux of write pole 22.

In order to write data to the high coercivity medium layer 40 of magnetic medium 14 with a lower write field, a high frequency write assist field may be generated at magnetic medium 14 proximate to write pole 22. According to the Stoner-Wohlfarth model, the switching field limit of the uniformly magnetized grains in medium layer 34 may be expressed as:

$$h_{sw}(\theta) = \frac{1}{(\cos^{2/3}(\theta) + \sin^{2/3}(\theta))^{3/2}}, \quad \text{(Equation 1)}$$

where $h_{sw}$ is the write field required to switch the magnetization direction of the grains in medium layer 40 and $\theta$ is the write field angle with respect to the easy axis anisotropy of the grains of medium layer 40. At near perpendicular write field angles, the write field required to impress magnetization reversal in the grains medium layer 40 is only slightly less than the easy axis anisotropy field. Thus, for a high coercivity medium, the write field required for reversal can be very high. However, research has shown that when a high frequency field is generated at magnetic medium 14, the field required to impress grain magnetization reversal is reduced significantly below that predicted by the Stoner-Wohlfarth model. Consequently, the coercivity of the medium layer 40 may be reduced by generating a high frequency field in medium layer 40 close to the write field generated by write pole 22 in magnetic medium 14.

In order to generate a high frequency field, conductive element 12 is provided to carry a high frequency current through pole tip 34. As will be described in more detail herein, when a high frequency current is applied to conducive element 12 and through pole tip 34, a magnetic field is generated around pole tip 34 with a magnitude and frequency that are a function of the magnitude and frequency of the applied high frequency current. The combination of the write field and the write assist field generated by the high frequency current through pole tip 34 overcomes the high coercivity of medium layer 40 to permit controlled writing of data to magnetic medium 14.

Figure 2A:
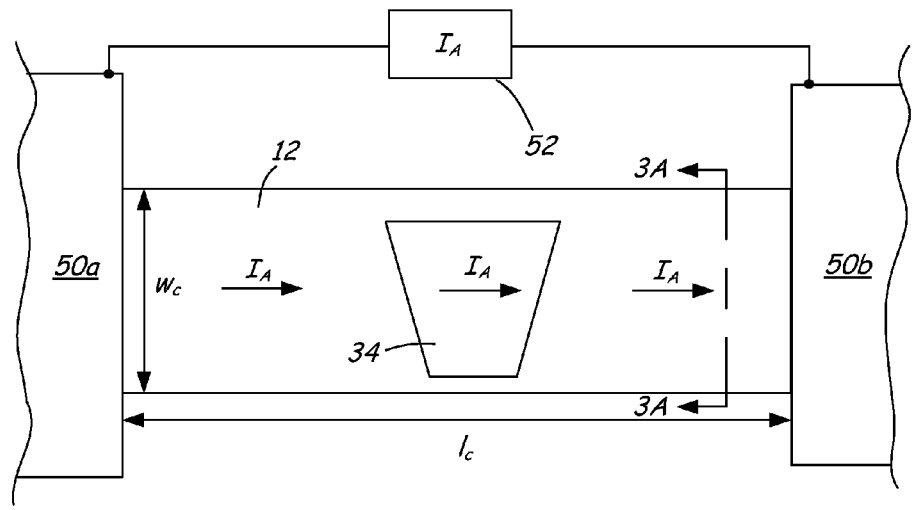
FIGS. 2A-2C are medium confronting surface views of embodiments of the conductive element and the pole tip.
Figure 2B:
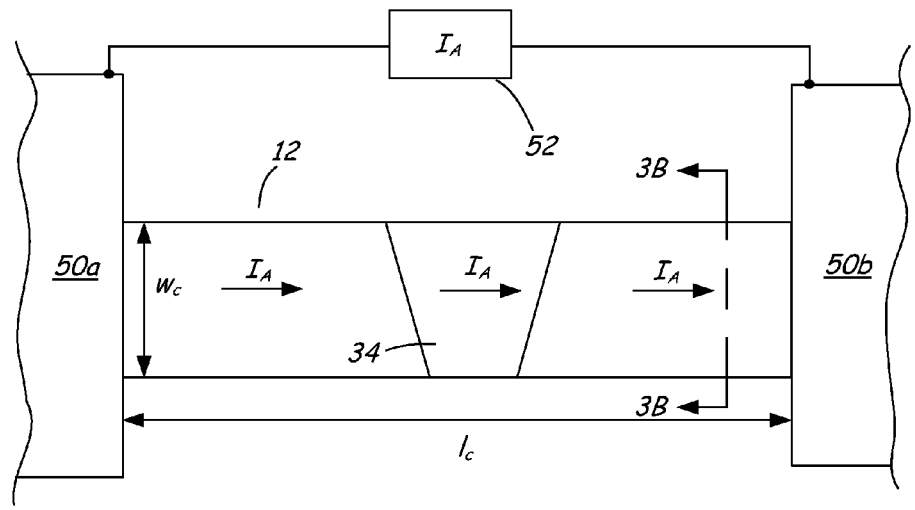
Figure 2C:
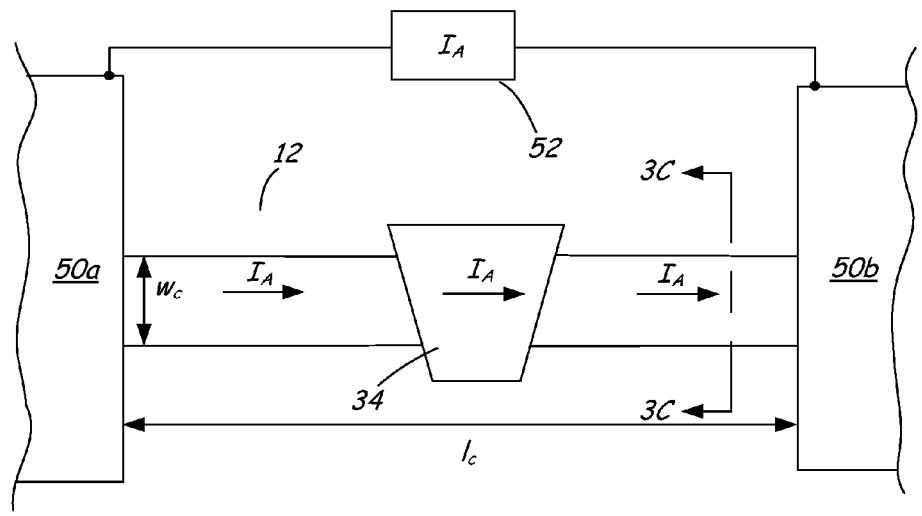

FIGS. 2A-2C are medium confronting surface views of embodiments of conductive element 12 and pole tip 34. Conductive element 12 has a down-track width $w_c$ and a cross-track length $l_c$. First electrical contact 50a is electrically connected to one end of conductive element 12 and second electrical contact 50b is electrically connected to an opposite end of conductive element 12. Electrical contacts 50a and 50b are coupled to write assist current source 52, which provides a write assist current $I_A$ that flows through electrical contacts 44a and 44b, conductive element 12, and pole tip 34. Write assist current $I_A$ generates a magnetic field (hereinafter referred to as a write assist field) around conductive element 12 and pole tip 34. While conductive element 12 is shown as having a width w, and a length $l_c$, conductive element 12 may have any shape that is effective for delivering write assist current $I_A$ through pole tip 34. In the embodiment shown in FIG. 2A, down-track width $w_c$ is greater than the down-track width of pole tip 34 (see also FIG. 3A). In other embodiments, width $w_c$ is less than (FIGS. 2C and 3C) or equal to (FIGS. 2B and 3B) the down-track width of pole tip 34. Cross-track length $l_c$ may be adjusted to maximize the write assist field generated around pole tip 34.

Pole tip 34 has a trapezoidal shape at magnetic medium 14 to decrease the dependence of the track width recorded by write pole 22 on the skew angle of magnetic writer 10 as it is carried over magnetic medium 14. This improves the recording density of magnetic writer 10 and reduces the bit error rate and side writing and erasure on adjacent tracks of magnetic medium 14. It should be noted that while pole tip 34 is shown having a trapezoidal shape, pole tip 34 may have any shape at magnetic medium 14 that is capable of generating a write field at magnetic medium 14 during the write process.

Figure 3A:
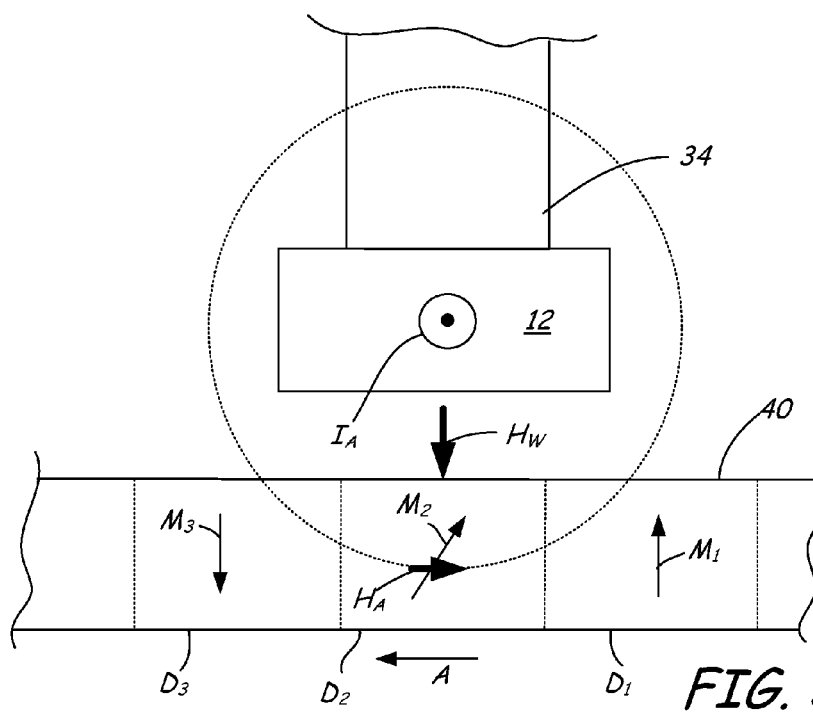
FIGS. 3A-3C are enlarged cross-sectional views of the conductive element and pole tip positioned relative to a magnetic medium, taken along lines 3A-3A, 3B-3B and 3C-3C in FIGS. 2A-2C, respectively.
Figure 3B:
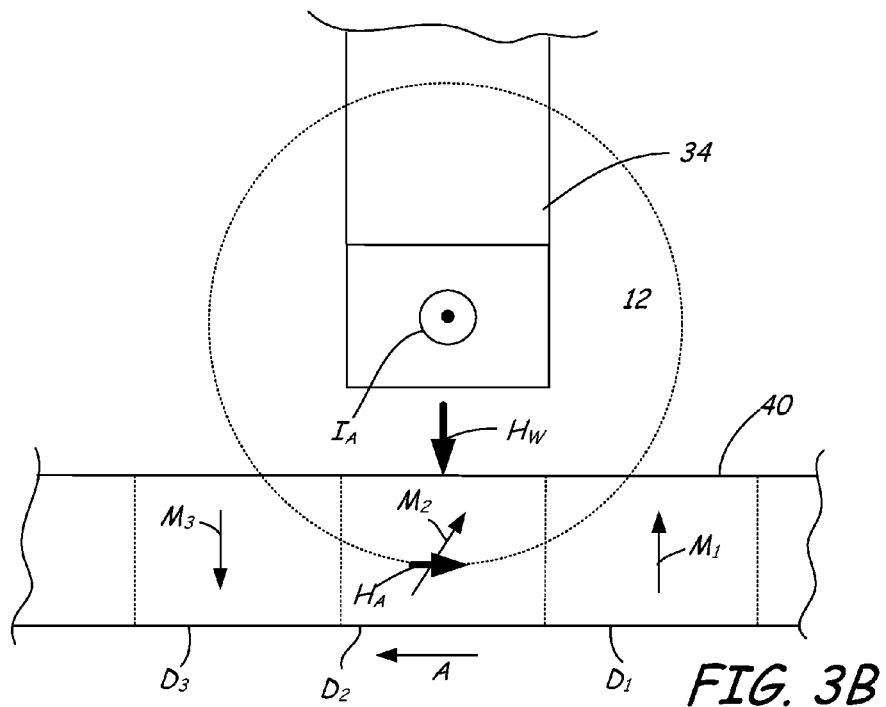
Figure 3C:
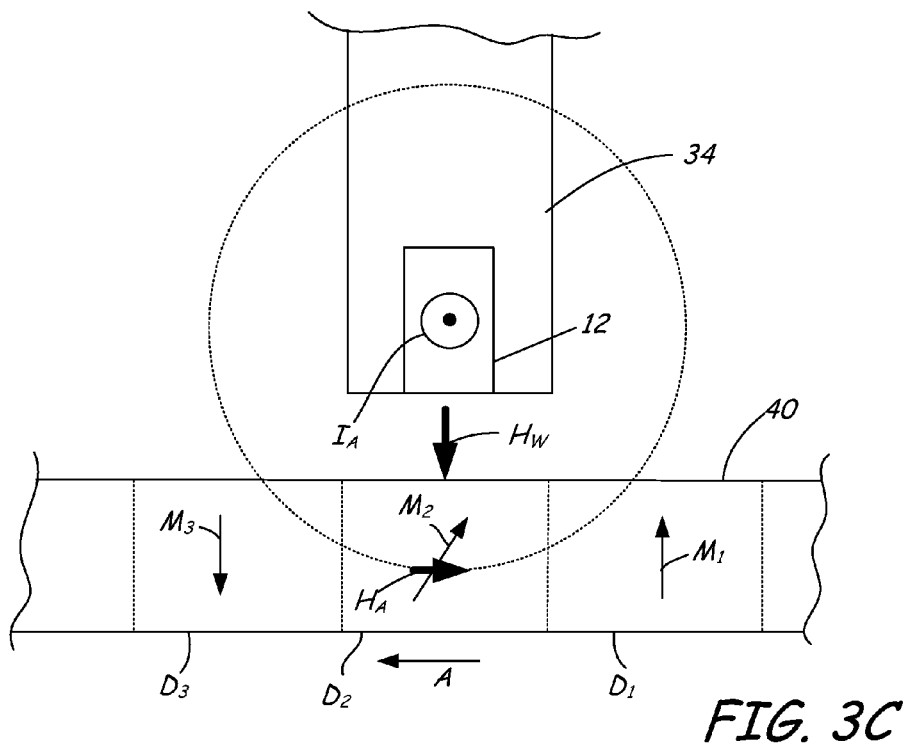

FIGS. 3A-3C are enlarged cross-sectional views of conductive element 12 and pole tip 34 positioned relative to medium layer 40 of magnetic medium 14, taken along lines 3A-3A, 3B-3B and 3C-3C in FIGS. 2A-2C, respectively. The direction of current $I_A$ determines the direction of the write assist field $H_A$ that is generated around conductive element 12 and pole tip 34 pursuant to the right-hand rule. In order to provide write assist field $H_A$ that assists write field $H_W$ provided by pole tip 34 of write pole 22, current $I_A$ is directed to generate a write assist field $H_A$ that is in the plane of medium layer 40. Write assist field $H_A$ causes the domains in medium layer 40 to rotate from perpendicular to the medium plane, which reduces the coercivity of the domain below the write element. Consequently, a lower write field $H_W$ may be employed to write to medium layer 40.

To illustrate, three domains $D_1$, $D_2$, and $D_3$ in medium layer 40 having magnetizations $M_1$, $M_2$, and $M_3$, respectively, are illustrated to show the process of writing to magnetic medium 14. In particular, magnetizations $M_1$, $M_2$, $M_3$ initially had directions pointing upward, and FIGS. 3A-3C illustrate the process of switching these magnetization directions (i.e., the data state) to point downward. Magnetic medium 40 is moving in direction A relative to pole tip 34, and thus magnetization $M_1$ is still in its initial upward pointing state. Domain $D_2$ is in the process of being written to, and write assist current $I_A$ is supplied through conductive element 12 and pole tip 34 to generate write assist field $H_A$ in the plane of medium layer 40, orthogonal to magnetization $M_2$. Write assist current $I_A$ has a magnitude such that the amplitude of write assist field $H_A$ is less than the anisotropy field of domain $D_2$, causing magnetization $M_2$ to rotate to an angle between perpendicular to medium layer 40 and parallel to medium layer 40. While write assist field $H_A$ is applied to medium layer 40, write field $H_A$ is applied perpendicular to medium layer 40. The perpendicular write field $H_A$ is able to finish driving magnetization $M_2$ over the energy barrier and complete the switching of the magnetization by 180° relative to the initial state. Because the magnetization is partially driven over the energy barrier by write assist field $H_A$, a lower write field $H_W$ is needed to switch the magnetization state of the domain. Magnetization $M_3$ shows the state of domain $D_3$ after the writing process.

In summary, the present invention relates to a writer including a write element having a tip portion for generating a write field and a conductive assembly that delivers a write assist current through the tip portion to generate a write assist field.

In some embodiments, the write field is perpendicular to the plane of the medium, and the write assist field is directed in the medium plane. The write assist field causes the domains in the magnetic medium to rotate from perpendicular to the medium plane, reducing the coercivity of the domain below the write element. Consequently, a lower write field may be employed to write to the magnetic medium.

Although the present invention has been described with reference to preferred embodiments, workers skilled in the art will recognize that changes may be made in form and detail without departing from the spirit and scope of the invention. For example, while the present invention has been described with regard to perpendicular recording applications, the principles of the present invention are also applicable to longitudinal and oblique/tilted recording applications.

The invention claimed is:

1. A writer comprising:
   a write element including a tip portion to generate a write field during a write operation; and
   a conductive assembly that is configured to deliver a write assist current through the tip portion in a cross-track direction to generate a write assist field during the write operation that extends beyond a medium confronting surface located at the tip portion to lower a coercivity of a magnetic medium proximate to the write element.

2. The writer of claim 1, wherein the tip portion and the conductive assembly define the medium confronting surface.

3. The writer of claim 2, wherein a dimension of the conductive assembly in a direction perpendicular to the write assist current is greater than a corresponding dimension of the tip portion at the medium confronting surface.

4. The writer of claim 2, wherein a down-track dimension of the conductive assembly is less than a down-track dimension of the tip portion at the medium confronting surface.

5. The writer of claim 2, wherein the conductive assembly delivers the write assist current parallel to the medium confronting surface.

6. The writer of claim 2, wherein the tip portion is surrounded by the conductive assembly at the medium confronting surface.

7. The writer of claim 1, wherein a magnitude and direction of the write assist field is a function of a magnitude and direction of the write assist current.

8. The writer of claim 1, wherein the write field is perpendicular to a magnetic medium plane and wherein the write assist field is in the magnetic medium plane.

9. A magnetic recording device comprising:
   a write pole including a write pole tip to generate a write field during a write operation;
   a conductive element electrically coupled to the write pole tip; and
   a write assist current source that is configured to deliver a write assist current to the conductive element such that the write assist current passes through the write pole tip in a cross-track direction to generate a write assist field during a write operation that extends beyond a front surface located at the tip portion to lower a coercivity of a magnetic medium proximate to the write pole tip.

10. The magnetic recording device of claim 9, wherein the write pole tip and the conductive element define the front surface.

11. The magnetic recording device of claim 10, wherein a front surface dimension of the conductive element in a direction perpendicular to flow of the write assist current is greater than a corresponding front surface dimension of the write pole tip.

12. The magnetic recording device of claim 10, wherein a front surface dimension of the conductive element is less than a corresponding front surface dimension of the write pole tip.

13. The magnetic recording device of claim 10, wherein the write pole tip is surrounded by the conductive element at the front surface.

14. The magnetic recording device of claim 10, wherein the write assist current source delivers the write assist current parallel to the front surface.

15. A method for writing to a magnetic medium, the method comprising:
    generating a write field from a write element;
    delivering a write assist current through the write element in a cross-track direction to generate a write assist field around the write element; and
    lowering a coercivity of the magnetic medium proximate to the write element using the write assist field.

16. The method of claim 15, wherein the write field is perpendicular to a plane of the magnetic medium and wherein the write assist field is in the magnetic medium plane.

17. The method of claim 15, wherein a magnitude and direction of the write assist field is a function of a magnitude and direction of the write assist current.

18. The method of claim 15, wherein delivering a write assist current through the write element comprises:
    electrically coupling a conductive element to the write element; and
    passing the write assist current through the conductive element such that the write assist current passes through the write element.

* * * * *